(12) United States Patent
Mueller et al.

(10) Patent No.: US 8,083,520 B2
(45) Date of Patent: Dec. 27, 2011

(54) REACTOR FOR DIRECT UTILIZATION OF EXTERNAL RADIATION HEAT FOR THERMAL OR THERMO-CHEMICAL MATERIAL PROCESSES

(75) Inventors: Reto Mueller, Oberlunkhofen (CH); Robert Palumbo, Brugg (CH); Peter Haeberling, Klingnau (CH)

(73) Assignee: Paul Scherrer Institut, Villigen PSI (CH)

( * ) Notice: Subject to any disclaimer, the term of this patent is extended or adjusted under 35 U.S.C. 154(b) by 855 days.

(21) Appl. No.: 11/666,996

(22) PCT Filed: Oct. 31, 2005

(86) PCT No.: PCT/EP2005/011659
§ 371 (c)(1),
(2), (4) Date: May 23, 2008

(87) PCT Pub. No.: WO2006/048224
PCT Pub. Date: May 11, 2006

(65) Prior Publication Data
US 2008/0314411 A1    Dec. 25, 2008

(30) Foreign Application Priority Data

Nov. 8, 2004   (EP) .................................... 04026418
Nov. 17, 2004  (EP) .................................... 04027271

(51) Int. Cl.
*F27B 7/08*           (2006.01)
(52) U.S. Cl. ........ 432/112; 432/103; 422/198; 422/209; 422/210
(58) Field of Classification Search .................. 432/103, 432/112; 422/198, 209, 210; 126/680
See application file for complete search history.

(56) References Cited

U.S. PATENT DOCUMENTS 3,285,476 A * 11/1966 Pellow et al. .................. 222/168
4,124,737 A * 11/1978 Wolfla et al. .................. 428/640
(Continued)

FOREIGN PATENT DOCUMENTS

CH           692927 A5 * 12/2002
(Continued)

OTHER PUBLICATIONS

Machine translation of CH 692 927 A5 to Haueter et al.*

(Continued)

*Primary Examiner* — Michael Kornakov
*Assistant Examiner* — Douglas Lee
(74) *Attorney, Agent, or Firm* — Laurence A. Greenberg; Werner H. Stemer; Ralph E. Locher

(57) ABSTRACT

A reactor for direct utilization of external radiation heat includes a containment can having a longitudinal axis, an external driving mechanism for controllable rotating the containment can and a cavity having a cylindrical shape. The cavity is partially lined with an insulation layer and disposed in the containment can. The cavity has a gas inlet, a gas outlet and an aperture for allowing to insert the external radiation heat into the cavity. A feeder mechanism is moveable along the longitudinal axis into and out of the cavity for supplying the material subject to the thermal or thermo-chemical material process. The gas outlet is formed as a ring channel tube having an inner and an outer surface, wherein the feeder mechanism is at least partially hosted within a tube cavity defined by the inner surface. Cooling means are associated with the inner and/or outer surface.

13 Claims, 3 Drawing Sheets

U.S. PATENT DOCUMENTS

| | | | | |
|---|---|---|---|---|
| 4,443,186 A | * | 4/1984 | Shell | 432/103 |
| 5,259,756 A | * | 11/1993 | Urza | 432/103 |
| 6,228,143 B1 | * | 5/2001 | Aiken et al. | 75/403 |

FOREIGN PATENT DOCUMENTS

| | | |
|---|---|---|
| DE | 199 52 174 A1 | 5/2001 |
| EP | 1 475 581 A1 | 9/2003 |
| WO | WO 03/004942 A1 | 1/2003 |

OTHER PUBLICATIONS

Derwent Abstract—WO-03/004942 A1; Jan. 16, 2003; Paul Scherrer Institut, CH-5232 Villigen, Switzerland.

Derwent Abstract—DE 199 52 174 A1; May 10, 2001; Bathen (D-44227 Dortmund, Germany), Sonnenschein (D-45529 Hattingen, Germany), Hahm (D-22453 Hamburg, Germany), Schmidt-Traub (D-45257 Essen, Germany).

* cited by examiner

REACTOR FOR DIRECT UTILIZATION OF EXTERNAL RADIATION HEAT FOR THERMAL OR THERMO-CHEMICAL MATERIAL PROCESSES

BACKGROUND OF THE INVENTION

The invention relates to a reactor for direct utilization of external radiation heat for thermal or thermo-chemical material processes.

In many chemical processes, solids need to be heated to high temperatures for the chemical reaction to proceed. If the reaction temperature is exceeding the operating temperature of conventional metals like steel, the apparatus has to be made from alternative high-temperature resistant materials. Examples of such energy-intensive high-temperature processes with considerable $CO_2$ emissions are the processing of lime and cement as well as the reduction of metal oxides.

Different types of solar reactors are known, even solar rotary kilns. However, they usually utilize direct sunlight as heat source. The solar energy is concentrated in a solar concentrator and focused through an aperture into the reaction chamber that is often tightly closed by a transparent window. Such applications locally yield high energy densities, Therefore, it is the aim of the present invention to provide a reactor of the mentioned type that can be heated by an external radiation heat source, in particular concentrated solar radiation, which is particularly well suited for the efficient utilization of direct radiation heat transfer for thermal or thermo-chemical processing of different materials at high temperatures.

This aim is achieve according to the present invention by a reactor for direct utilization of external radiation heat for thermal or thermo-chemical material processes, comprising:
a) a containment can having a longitudinal axis,
b) an external driving mechanism for controllable rotating the containment can,
c) a cavity having a substantially cylindrical shape, said cavity being at least partially lined with an insulation layer and being disposed in said containment can,
d) said cavity having at least one gas inlet and at least one gas outlet and an aperture for allowing to insert the external radiation heat into the cavity,
e) a feeder mechanism being moveable along the longitudinal axis into and out of the cavity for supplying the material subject to the thermal or thermo-chemical material process;
f) said at least one gas outlet is formed as a ring channel tube having an inner and an outer surface; whereby the feeder mechanism is at least partially hosted within a tube cavity defined by said inner surface; and
g) cooling means being associated with said inner and/or outer surface.

These features lead to a reactor that delivers the heat directly into the cavity for the thermal or thermochemical processing of the feed material that is homogeneously heated by controlling the rotation speed of the containment can position. In contrast to conventional processes, a homogeneous and clean thermal or thermochemical processing of the feed materials is ensured. By defining a heat gradient along the annular shaped gas outlet by the cooling means allow to collect the desired reaction products outside of the cavity.

The mechanical feeder system is crucial for the supply and the distribution of the reactant particles throughout the cavity.

In order to provide a broad range of flexibility said feeder mechanism can be formed as a screw conveyor. This mechanism enables the operator of the reactor to match current solar conditions and the chemical reactivity of the reactants so that the reactor can operate under optimal conditions. The feeding can thus be one ranging from continuous to batch operation.

In order to prevent a relevant heat transfer into said feeder mechanism, a thermally insulated head section can be provided which shields the water cooled screw conveyor from the hot cavity when there is no feeding. This arrangement helps reduce heat loss from the cavity to the water cooled feeder.

For the controlled gathering of gaseous reaction products the inner and/or outer surface of the ring channel gas outlet can be cooled by the cooling means to generate a negative temperature gradient as seen in the flow direction of a reaction gas flowing from the cavity through the gas outlet. To support this gathering at distinct locations or within a distinct range of the gas outlet ring channel, cooling inert gas can be introduced into the ring channel, such as an inert gas like Ar and/or nitrogen. This measure allows the operator of the reactor to design the temperature gradient so that at least one reaction product from the chemical or thermo-chemical material process is condensing and/or solidifying on the cooled inner and/or outer surface within the ring channel.

A suitable measure for the removal of the condensed or solidified reaction product is to abrade it from the inner and/or outer surface by scraper means that can optionally and in a preferred embodiment be disposed on the inner and/or outer surface being activated by the movement of the feeder mechanism. The feeder can also be retracted toward the back of the cavity. When this occurs the inner and/or outer surface of the feeder is swept by a scraper and the particles that formed on the feeder's cold surface are dragged out of the reactor where the gas also exits the reactor.

To increase the lifetime of the insulation layer defining the cavity, the insulation layer may comprise a protective barrier towards the cavity in order to prevent the reaction material from damaging the thermal insulation around the cavity. The barrier is primarily for preventing the gaseous products from being lost in the insulation. In a preferred embodiment, the protective barrier is a thin layer selected from the group consisting of silicon carbide, or hafnium oxide and possibly thorium oxide or other suitable materials.

In order to maintain an efficient chemical or thermo-chemical process an inert gas can be introduced at the gas inlet into the cavity, said gas being preheated to prevent reaction products from condensing in the hot cavity.

The quality of the feed material and the quality and/or quantity demands for the reaction product may differ from case to case what requires a certain flexibility with respect to the process parameters. Therefore, the containment can be rotated at a rotational speed in the range of 20 to 200 rpm, preferably in the range of 80 to 150 rpm.

In order to simplify the constructive measure of the reactor said containment may preferably rotate along its longitudinal axis. It should be mentioned that the containment can may alternatively rotate along an arbitrary axis.

For the homogeneity of the process and the flow of the feed material a reaction product originating from the feed material is continuously removed through the gas outlet. Therefore, the ring channel is shaped as a collector for collecting the reaction product even when the containment can is rotating.

By collecting the removed process gas and preheating the feed material with the collected process gas the energy balance of the process can be improved.

The lifetime of the reactor and the homogeneity of the temperature distribution both are significantly a function of the material properties of the used materials. made from a high-temperature resistant and thermally nonconductive ceramic material.

The external radiation entering the cavity assembly through the aperture may have an average energy flux in the range of 150-500 Watts/cm$^2$, when concentrated solar radiation is used. This power density has to be transferred into the cavity with a certain focussing but even with a certain homogeneous distribution. Therefore, a heat shield is provided to protect the edges of said aperture from said concentrated external radiation heat. The heat shield can be made from a heat resistant material or can be made from a fluid cooled metal, preferably aluminium or copper. Additionally, the heat shield can be suitably ring-shaped and comprises said aperture of said cavity. To diminish the leakage of heat from the cavity, said cavity may comprise a gas-cooled transparent window for said incident external radiation heat. For the purpose of increasing the solar gain, said aperture may comprise a secondary concentrator.

The reactor is generally suited for all thermal or thermochemical material processes which allows to use as the feed material any type of organic, inorganic, metallic, or ceramic solids, as well as mixtures of them, which are then subject to said thermal or said thermochemical material processing. Especially; fine-grained materials, such as zinc oxide, are preferred to generate a reaction product, such as zinc. Therefore, the reactor according to this invention is particularly suited for the clean processing of a variety of fine-grained materials at temperatures exceeding 1500 K. Utilizing this invention, some processing operations, which are currently carried out in direct-fired rotary kilns, for example that of lime production, may be more economical due to energy savings and other benefits of the reactor design of this invention.

Further advantageous features result from the dependent claims, the following description, and FIG. 3 described below.

BRIEF DESCRIPTION OF THE SEVERAL VIEWS OF THE DRAWINGS

For one preferred embodiment of a reactor according to the present invention, the principle of the invention is described and illustrated in the appended drawings.

DETAILED DESCRIPTION OF THE INVENTION

Figure 1:
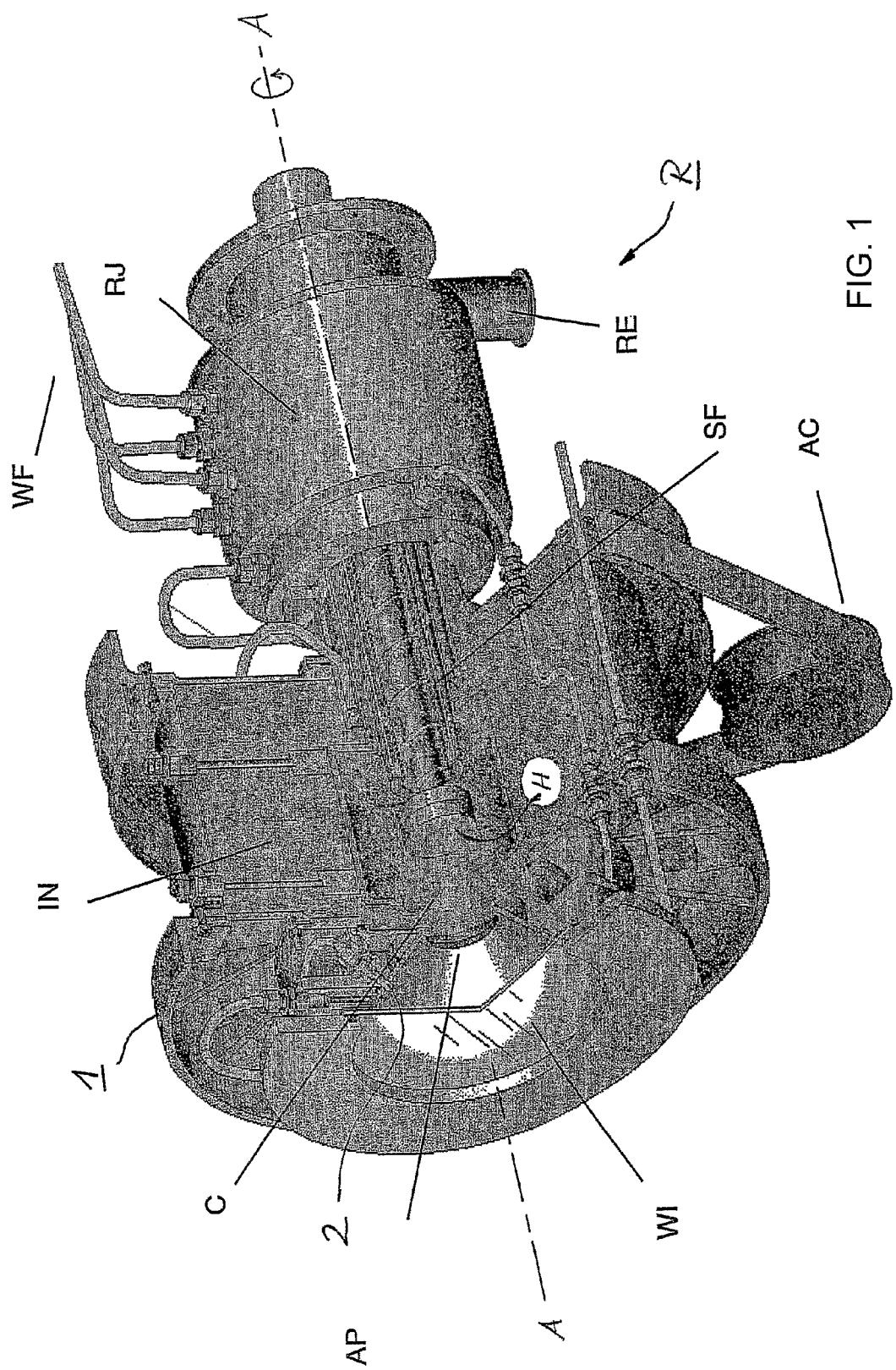
FIG. 1 is a schematic cross-sectional perspective view of an embodiment of the reactor.
Figure 2:
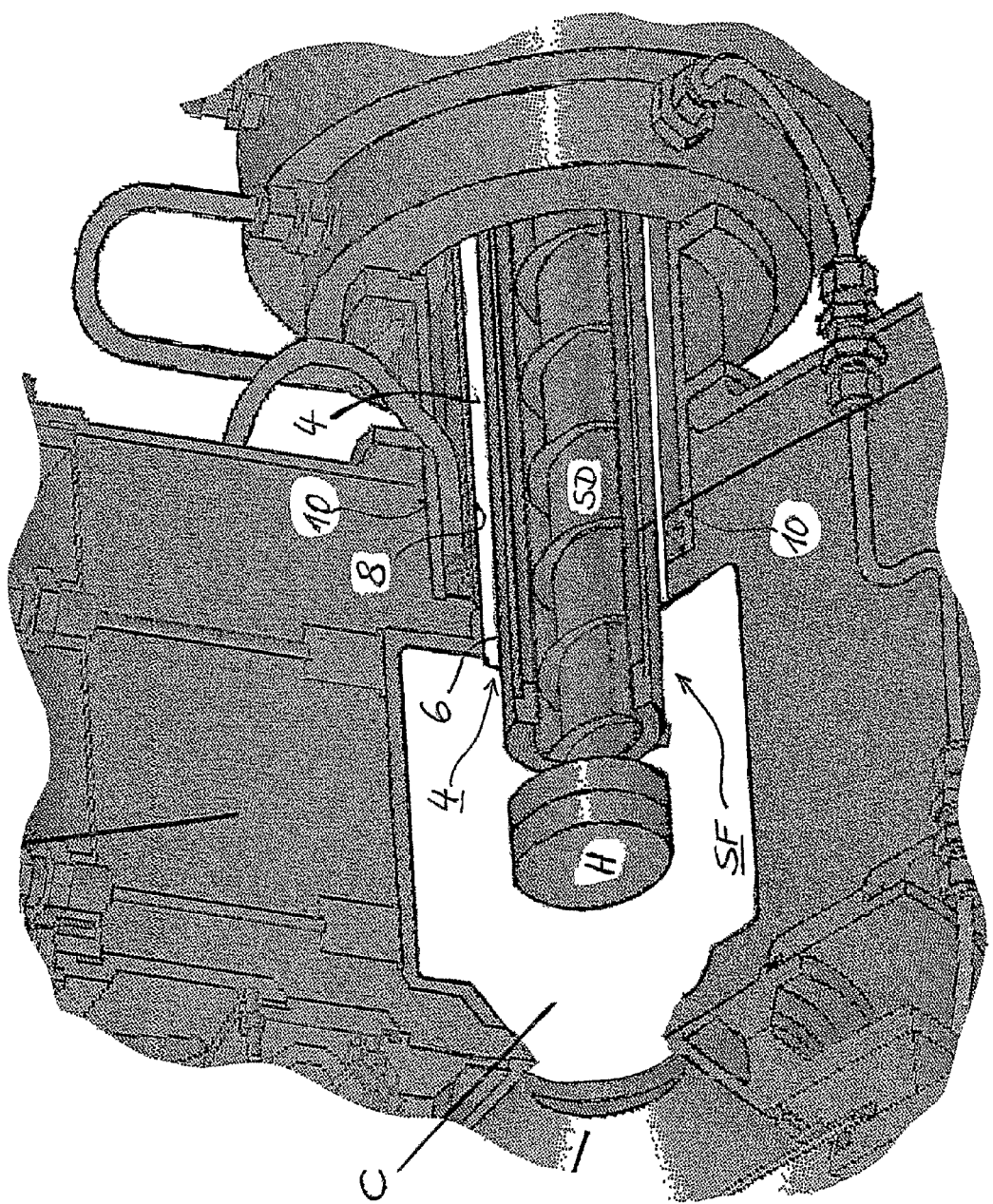
FIG. 2 is a schematic cross-sectional perspective view of an enlarged region of the reactor according to FIG. 1.
Figure 3:
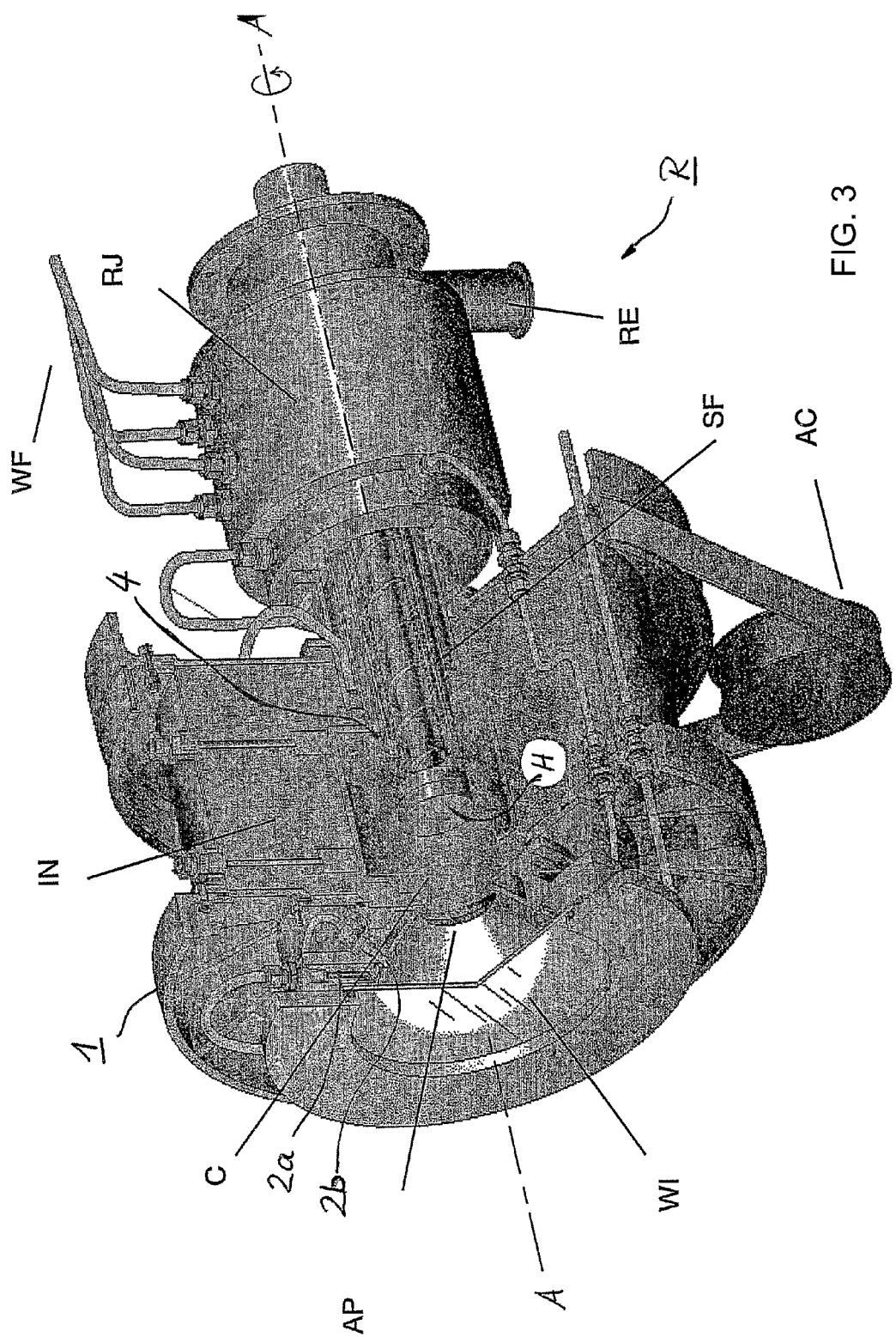
FIG. 3 is a schematic cross-sectional perspective view of another embodiment of the reactor having two gas inlets.

With reference to FIG. 1, the reactor R according to the present invention comprises a containment can 1 that can be rotated around its longitudinal axis A-A by means of an external driving mechanism AC. The rotation speed has a significant impact on the residence time of the feed material in the reactor R, in detail in the material flow path of the reactor R which is described below. Within the containment can 1, a high-temperature resistant thermal insulation layer IN is tightly mounted. This insulation layer IN designs a cavity C into which external radiation can be introduced via an aperture AP.

The feed material, in this specific embodiment zinc oxide as fine-grained solid material, is fed through a screw feeder SF 10 into the cavity C. The screw feeder SF has a head portion H, which is formed as a water cooled copper head with a zirconia heat insulation. This insulated head portion H prevents the heat from the cavity C from entering into the inner volume of screw feeder SF which hosts the screw device SD. The zinc oxide particle are fed into the cavity C in a semi-continuous manner and are distributed in a thin layer evenly along the wall of the cavity C due to the centripetal acceleration of the cavity C. The particles are thus heated directly by solar radiation that enters the cavity and, of course, the particles are heated indirectly by the hot wall of the cavity C. The chemical reaction, here the thermal or if desired the carbo-thermal decomposition of ZnO, is thus taking place on a large surface area of particles. Due to the large exposed surface area of the reactants and due to the very small temperature gradient within the cavity C, for which SiC or Hafnium is an excellent thermal conductor, high decomposition rates are achieved. The zinc remains in its gaseous state within the cavity C and is dragged out of the cavity C with the inert gas being preheated introduced into the cavity C via gas inlets 2. The dragged out gas mixture leaves the cavity C at an annular gas outlet 4 that is formed as a ring channel having an inner surface 6 and an outer surface 8. The inner surface 6 is thereby defining an inner ring cavity in which the screw feeder SF is disposed.

The screw feeder SF can evenly distribute the zinc oxide particles throughout the cavity C. During feeding, the screw feeder SF extends into the hot cavity C and retracts, distributing the particles along the wall of the cavity C due to the centripetal acceleration of the cavity C caused by the driving mechanism AC. By controlling the operation of the screw feeder SF the operator is able to match the current solar conditions and the chemical reactivity of the reactants so that the reactor R can operate under optimal conditions. This control comes through the fact that the operator can change at any time the feed rate and the amount of reactants that are fed during a given feed. The feeding condition is thus one ranging from continuous to batch operation.

The screw feeder SF is an integrated part of the quench system. The products exits the cavity C through the ring channel 4 that extends parallel to the longitudinal axis A-A of the reactor R. The external water cooled surface (supplied by water ducts WF within a rotary joint RJ) of the screw feeder SF which is equal to the inner surface 6 of the ring channel 4 is one quench surface and the internal wall of a surrounding water cooled cylinder 10 which was defined as the outer surface 8 of the ring channel 4 is another quenching surface. The products are quenched on these surfaces 6 and 8 and are additionally quenched due to the large temperature gradient caused on the product by introduction of cold inert gas, like nitrogen and/or an inert gas like Ar. Some of the zinc will fall onto the inner surface 6 (the surface of the screw feeder SF). When the screw feeder SF is retracted further to the back of the reactor R, the zinc particles are scrubbed from this surface and forwarded to an opening RE in the reactor R where can exit the reactor R together with the remaining components of Zn in the initial gas stream.

Of course, the reactor R according to the present invention can be used in all application where the reaction products are in gaseous form and will at least partially fall off in the ring channel 4 where significant quenching take place due to the tremendous temperature gradient caused by the cooled surfaces 6 and 8.

Further, in many chemical processes, solids need to be heated to high temperatures for the chemical reaction to proceed. If the reaction temperature is exceeding the operating temperature of conventional metals like steel, the apparatus has to be made from alternative high-temperature resistant materials. Examples of such energy-intensive high-temperature processes with considerable $CO_2$ emissions are the processing of lime and cement as well as the reduction of metal oxides as well as the decomposition of organic materials, such as crude oil, bio mass or other material suited to deliver various organic fuels or organic gases.

Different types of reactors are known for this purposes, even solar rotary kilns. However, and despite of the generation of the desired product from the raw material, a relevant portion of the desired product is deposited on the hot inner surfaces of the reactor. These reactors usually have apertures, enclosed by a window, to control the thermal and/or thermochemical process, i.e. prevent ambient air from entering the reactor. Unfortunately, these apertures (windows) are as well subject to undesired deposition like the other inner surfaces of the reactor. Very often the windows are cooled for protecting them from fair wear and tear which increases the potential for product condensation on this still hot but significantly colder surface. Ongoing deposition will therefore jeopardize these functionalities and it is therefore required to clean at least those windows from time to time.

For cleaning the window, the window usually has to be removed from the reactor and therefore, the thermal and/or thermo-chemical material process has to be suspended during the cleaning period.

Therefore, it is the aim of the present invention to provide a reactor and a method for thermal or thermo-chemical processing of different materials at high temperatures where the necessity for the cleaning of hot inner surfaces, such as windows, can be easily solved without suspending the material process.

This aim is achieved according to the present invention by a reactor for hot thermal or thermo-chemical material processes converting a raw material at least partially into a desired product, comprising:
  a) a cavity having a hot inner surface; said cavity being disposed in a containment can,
  b) said cavity having at least one gas inlet and at least one gas outlet,
  c) a feeder mechanism for supplying the raw material subject to the thermal or thermo-chemical material process;
  d) said at least one gas inlet is formed for injecting a gas flow towards at least a part of the hot inner surface; and
  e) the gas that would be used as needed to clean the window chosen to convert a deposited product on the window, a product that is often undesired to the desired product which has a higher volatility at reaction temperature than the undesired product itself.

In all cases, undesired means a product that formed where it should not form if one is to ensure proper operation of the device. In some cases, the actual compound that forms is truly an undesired compound that formed from a recombination reaction. For example when zinc is produced from zinc oxide, zinc oxide may form on an undesired surface. Here the zinc oxide too as a compound was undesired. The process does two good things: it cleans the surface can produces a desired chemical compound. But sometimes one is trying to produce a metal that condenses on an undesired surface. By oxidizing some metals from the surface, the surface is cleaned, because a few metals have oxides with higher vapour pressures than the metal itself. In this particular case the objective of a clean surface was reached, but the metal oxide that forms is not ultimately the desired final product. In such a case a compromise was made, a clean surface to keep the process running but the formation of a small amount of undesired product.

With respect to the method according to the present invention a method for cleaning a hot inner surface of a reactor used for hot thermal or thermo-chemical material processes converting a raw material at least partially into a desired product is used, said method comprising:
  a) providing a cavity having a hot inner surface; said cavity being disposed in a containment can,
  b) providing said cavity having at least one gas inlet and at least one gas outlet,
  c) providing a feeder mechanism for supplying the raw material subject to the thermal or thermo-chemical material process;
  d) forming said at least one gas inlet for injecting a gas flow towards at least a part of the hot inner surface; and
  e) choosing the gas or at least one component thereof for converting the undesired product that formed onto the window into a compound having a higher volatility at reaction temperature than the undesired deposited product itself.

Both the reactor and the method allow to clean the hot inner surfaces without suspending the thermal and/or thermo-chemical material process since the suitable gas can be introduced in situ. By injecting the gas flow towards the inner surface to be cleaned the removal/re-conversion of the product can be limited to the extent necessary. By controlling the flow rate of the gas flow any negative impact of an excess amount of gas injected can be avoided.

Typically, said at least part of the hot inner surface can be an aperture for allowing optical access to the cavity. Said aperture can be enclosed by a hot quartz reactor window. Advantageously, the aperture can be used to insert the external radiation heat into the cavity while preventing the flow through the aperture of ambient air.

A preferred embodiment according to the present invention uses zinc oxide as a component of the raw material or as the raw material. Accordingly, the gas comprises carbon monoxide which reduces the zinc oxide formed on the window into zinc which then vaporizes off the window. In another suitable example the raw material may comprise a component selected from a group consisting of manganese oxide, iron oxide and molybdenum oxide and the gas may comprise oxygen. In a further example the raw material may comprise organic compounds and the gas may comprise water vapour.

Even under the in situ injection of the gas flow, the gas flow may be injected continuously or periodically during the hot thermal or thermo-chemical material process. It is therefore possible to control the flow rate in the dependency of the parasitic deposition of the product which has to be removed from the inner surface. When this parasitic deposition can be measured automatically, a simple control algorithm for the flow rate of the "cleaning" gas can be established in order to clean the inner surface also automatically.

The reactor is generally suited for all thermal and/or thermo-chemical material processes which allows to use as the feed material any type of organic, inorganic, metallic, or ceramic solids, as well as mixtures of them, which are then subject to said thermal and/or said thermo-chemical material processing. Especially, fine-grained materials, such as zinc oxide, are preferred to generate a reaction product, such as zinc. Therefore, the reactor according to this invention is particularly suited for the clean processing of a variety of fine-grained materials at temperatures exceeding 1500 K. Utilizing this invention, some processing operations, which are currently carried out in direct-fired rotary kilns, for example that of lime production, may be more economical due to energy savings and other benefits of the reactor design of this invention.

Further advantageous features result from the dependent claims, the following description, and the third drawings.

For one preferred embodiment of a reactor according to the present invention, the principle of the invention is described and illustrated in the appended third drawing. The figure is a schematic cross-sectional perspective view of an embodiment of a reactor R. The reactor R according to the present invention comprises a containment can 1 that can be rotated around its longitudinal axis A-A by means of an external driving mechanism AC. The rotation speed has a significant impact on the residence time of the feed material in the reactor R, in detail in the material flow path of the reactor R. Within the containment can 1, a high-temperature resistant thermal insulation layer IN is tightly mounted. This insulation layer IN designs a cavity C into which external radiation can be introduced via an aperture AP which is sealed by a quartz window WI.

The feed material, in this specific embodiment zinc oxide as fine-grained solid material, is fed through a screw feeder SF 10 into the cavity C. The screw feeder SF has a head portion H, which is formed as a water cooled copper head with a zirconia heat insulation. This insulated head portion H prevents the heat from the cavity C from entering into the inner volume of screw feeder SF which hosts the screw device SD. The zinc oxide particle are fed into the cavity C in a semi-continuous manner and are distributed in a thin layer evenly along the wall of the cavity C due to the centripetal acceleration of the cavity C. The particles are thus heated directly by solar radiation that enters the cavity and, of course, the particles are heated indirectly by the hot wall of the cavity C. The chemical reaction, here the thermal, or if desired, the carbo-thermal decomposition of ZnO, is thus taking place on a large surface area of particles. Due to the large exposed surface area of the reactants and due to the very small temperature gradient within the cavity C, for which SiC or Hafnium is an excellent thermal conductor, high decomposition rates are achieved. The predominant portion of the zinc remains in its gaseous state within the cavity C and is dragged out of the cavity C with the inert gas being preheated introduced into the cavity C via gas inlets 2a and 2b. The dragged out gas mixture leaves the cavity C at an annular gas outlet 4. Unfortunately, a small portion of the gaseous zinc is deposition on the window WI of the aperture AP. To clean the window periodically, the inert gas inserted via the gas inlet 2b is added with a small amount of carbon monoxide in the range of 1 to 10 vol % of the gas flow. The gas flow is injected towards the window WI so that the carbon monoxide content of the gas flow is immediately interacting with the deposited zinc oxide. The zinc oxide is reduced to zinc which has a higher volatility than the zinc oxide itself at the elevated temperature in the cavity C. The window WI is therefore kept sufficiently hot to enable the reaction between the injected carbon monoxide and the zinc oxide on the inner surface, in this example the window WI.

From this example, the general teaching of the present invention can easily be understood. The surface to be cleaned in situ has to be maintained at temperature sufficiently hot to allow for a reaction between the injected gas flow or a component contained in the injected gas flow and the chemical substance deposited on the inner surface. Of course, a gas or a gas mixture has to be used that masters the desired reaction in order to generate a reaction product having a higher volatility than the deposited chemical substance. Additionally, due to the injection of the gas or the gas mixture towards the inner surface to be cleaned, the gas or the gas mixture is brought sufficiently into contact with the surface to be cleaned. Therefore, it can be easily understood that a very broad variety of applications for the present invention exists, such as the removal of organic compounds from the inner surface by injecting a portion of hot water steam or the removal of other metals, such as molybdenum or osmium, from the inner surface by injecting a portion of hot oxygen.

The invention claimed is:

1. A reactor for direct utilization of external radiation heat for thermal or thermo-chemical material processes, comprising:
   a) a containment can having a longitudinal axis;
   b) an external driving mechanism for controllable rotating the containment can;
   c) a cavity having a substantially cylindrical shape, said cavity being at least partially lined with an insulation layer and being disposed in said containment can;
   d) said cavity having at least one gas inlet and at least one gas outlet and an aperture for allowing to insert external radiation heat into the cavity;
   e) a feeder mechanism being moveable along the longitudinal axis into and out of the cavity for supplying a reaction material subject to the thermal or thermo-chemical material process;
   f) said at least one gas outlet being formed as a ring channel tube having an inner and an outer surface, whereby the feeder mechanism is at least partially hosted within a tube cavity defined by said inner surface; and
   g) cooling means being associated with at least one of said inner and outer surface.

2. The reactor according to claim 1, wherein said feeder mechanism is formed as a screw conveyor.

3. The reactor according to claim 2, wherein said feeder mechanism comprises a thermally insulated head section.

4. The reactor according to claim 1, wherein at least one of the inner and outer surface of the ring channel shaped gas outlet is cooled by the cooling means to generate a negative temperature gradient with respect to a flow direction of a reaction gas flowing from the cavity through the gas outlet.

5. The reactor according to claim 4, wherein at least one reaction product from the chemical or thermo-chemical material process is condensing on at least one of the cooled inner and outer surface.

6. The reactor according to claim 5, wherein the reaction product is abraded from at least one of the inner and outer surface by scraper means.

7. The reactor according to claim 1, wherein cooling inert gas is introduced into the ring channel.

8. The reactor according to claim 1, wherein the insulation layer comprises a protective barrier towards the cavity in order to prevent the reaction material from being lost in the insulation and to prevent it from damaging the thermal insulation surrounding the cavity.

9. The reactor according to claim 8, wherein the protective barrier is a thin layer selected from the group consisting of Silicon Carbide, hafnium oxide, and thorium oxide.

10. The reactor according to claim 1, wherein at the gas inlet at least one of an inert and a reactive gas is introduced into the cavity being preheated to prevent reaction products from forming in the cavity.

11. The reactor according to claim 1, wherein the containment can is rotating with a rotational speed in the range of 20 to 200 rpm when the feeder mechanism is moved into the cavity for supplying the reaction material.

12. The reactor according to claim 1, wherein the insulating layer defining the cavity is made from a high-temperature resistant and thermally nonconductive ceramic material.

13. The reactor according to claim 1, wherein said aperture comprises a gas-cooled transparent window for said incident external radiation heat.

* * * * *